US008327175B2

(12) United States Patent
Kim et al.

(10) Patent No.: US 8,327,175 B2
(45) Date of Patent: Dec. 4, 2012

(54) DATA PROCESSING SYSTEMS AND METHODS OF OPERATING THE SAME IN WHICH MEMORY BLOCKS ARE SELECTIVELY ACTIVATED IN FETCHING PROGRAM INSTRUCTIONS

(75) Inventors: Young-jun Kim, Gyeonggi-do (KR); Yong-ha Park, Gyeonggi-do (KR)

(73) Assignee: Samsung Electronics Co., Ltd. (KR)

( * ) Notice: Subject to any disclaimer, the term of this patent is extended or adjusted under 35 U.S.C. 154(b) by 0 days.

(21) Appl. No.: 12/698,392

(22) Filed: Feb. 2, 2010

(65) Prior Publication Data
US 2010/0225656 A1 Sep. 9, 2010

Related U.S. Application Data

(63) Continuation-in-part of application No. 11/476,532, filed on Jun. 28, 2006, now abandoned.

(30) Foreign Application Priority Data

Jul. 7, 2005 (KR) .................. 10-2005-0061236

(51) Int. Cl.
*G06F 1/32* (2006.01)
(52) U.S. Cl. ..................................... 713/323
(58) Field of Classification Search .......... 711/201; 712/205, 206, 207; 713/323, 324; 717/140
See application file for complete search history.

(56) References Cited

U.S. PATENT DOCUMENTS

| | | | |
|---|---|---|---|
| 5,815,697 A | 9/1998 | Bosshart et al. | |
| 6,278,648 B1 | 8/2001 | Cowles et al. | |
| 6,334,212 B1* | 12/2001 | Nakajima | 717/141 |
| 6,442,701 B1* | 8/2002 | Hurd | 713/324 |
| 6,493,868 B1 | 12/2002 | DaSilva et al. | |
| 6,957,319 B1 | 10/2005 | McMinn et al. | |
| 7,500,126 B2* | 3/2009 | Terechko et al. | 713/323 |
| 2001/0042155 A1 | 11/2001 | Nameki | |
| 2004/0049652 A1* | 3/2004 | Troutman et al. | 711/219 |
| 2005/0050300 A1* | 3/2005 | May et al. | 712/24 |

\* cited by examiner

*Primary Examiner* — Jacob A Petranek
(74) *Attorney, Agent, or Firm* — Myers Bigel Sibley & Sajovec, P.A.

(57) ABSTRACT

A processing unit includes an instruction fetch unit that is configured to process a compiled instruction that includes a plurality of fields. The plurality of fields includes a flag field that identifies memory blocks to be activated for fetching a next instruction. Each of the memory blocks has stored therein one or more fields used to form the next instruction and assigned to the memory blocks in a predetermined way. A block enable signal generator is configured to generate at least one block enable signal to selectively activate the memory blocks in the predetermined way. The flag field is included in fields of an instruction having the shortest length among instructions of the processing unit.

16 Claims, 9 Drawing Sheets

DATA PROCESSING SYSTEMS AND METHODS OF OPERATING THE SAME IN WHICH MEMORY BLOCKS ARE SELECTIVELY ACTIVATED IN FETCHING PROGRAM INSTRUCTIONS

RELATED APPLICATION

This U.S. non-provisional patent application claims the benefit of and priority under 35 U.S.C. §119 to Korean Patent Application No. 10-2005-0061236, filed Jul. 7, 2005, in the Korean Intellectual Property Office, and is a Continuation-in-Part of application Ser. No. 11/476,532 filed on Jun. 28, 2006 now abandoned the disclosures of which are hereby incorporated herein by reference as if set forth in their entirety.

FIELD OF THE INVENTION

The present invention relates to data processing systems, and, more particularly, to fetching and executing instructions in data processing systems, such as graphics processing systems.

BACKGROUND OF THE INVENTION

Three-dimensional (3D) graphics systems may realistically display moving images using a 3D accelerator. Using 3D graphic technology, a 3D object may be represented using three coordinates—height, width, and length—which are used to display the 3D object on a two-dimensional monitor. The 3D accelerator may used to rapidly perform 3D graphic processing through a hardware-implemented graphic arithmetic unit.

Conventional graphics systems may include a graphical processing unit (GPU) inside a 3D accelerator. The GPU may enable a user to create new operations that may be desired in addition to providing standard built-in functionality. These new operations may provide improved video quality. Moreover, system performance may be improved by using multiple GPUs in a parallel processing configuration.

FIG. 1 illustrates a conventional graphics system 100, which includes a GPU 110, system memory 120, peripheral device 130, system bus 140, host 150, frame buffer 160, display control unit 170, and display device 180 that are configured as shown. The GPU 110 performs commands requested by the host 150 and/or peripheral device 130 using a 3D graphic processing program and/or 3D graphic models/data stored in the system memory 120. Graphics data that are translated by the GPU 110 are stored in the frame buffer 150 and are displayed through the display control unit 170 on the display device 180.

FIG. 2 is a block diagram that illustrates the GPU 110 of FIG. 1 in more detail. The GPU 110 includes an instruction memory 210, an instruction fetch unit 220, an instruction decoder 230, an operand fetcher 240, an execution unit 250, a write back unit 260, and a register file 270 that are configured as shown. The instruction fetch unit 220 includes a program counter 221 and an instruction register 223. Instructions are stored in the instruction memory 210 based on host 150 requests. An instruction may consist of a plurality of fields, such as an OPCODE, which specifies the type of instruction and the structure of the data on which the instruction operates, and parameters for instruction operation, such as a source address of an operand and/or a destination address of an operation result.

The instruction fetch unit 220 includes a program counter 221 that outputs a row address RADD that is used to access an address of an instruction in the instruction memory 210. The instruction memory 210 outputs an instruction responsive to the row address RADD and a read enable signal RE generated by the instruction fetch unit 220. The instruction is loaded into the instruction register 223.

The instruction decoder 230 decodes the OPCODE of the instruction stored in the instruction register 223 to determine the instruction type. The operand fetcher 240 fetches any operand associated with the instruction based on an operand address contained in the instruction. The execution unit 250 executes the instruction based on the type determined from the OPCODE and the fetched operand if applicable. The write back unit 260 stores the result of executing the instruction in the register file 270 at a destination address specified in the instruction.

An instruction may include a variety of fields depending on the instruction type and/or the number of operands needed. In complicated programs that are often used in 3D graphics processing, instructions may vary widely in the number of fields associated therewith. As a result, successive instructions may differ widely in the number of fields used in executing the instructions. The instruction memory 210 and instruction register 223 are typically designed based on the size of the instruction that has the largest number of fields associated therewith. The number of instruction fields fetched when fetching an instruction from the instruction memory 210 may be based on the instruction with the most instruction fields associated therewith. This may result in unnecessary power consumption due to switching of memory management circuits to fetch unused instruction fields when fetching an instruction that uses fewer than the greatest number of instruction fields.

SUMMARY

According to some embodiments of the present invention, a processing unit includes an instruction fetch unit that is configured to process an instruction that includes a plurality of fields. The plurality of fields includes a flag field that identifies at least one of a plurality of memory blocks to be activated for fetching a next instruction.

In other embodiments, the processing unit further comprises an instruction memory that includes the plurality of memory blocks.

In still other embodiments, the instruction fetch unit further includes a block enable signal generator that is configured to generate at least one block enable signal to selectively activate the identified at least one of the plurality of memory blocks responsive to the flag field.

In still other embodiments, the block enable signal generator is configured to generate block enable signals to active all of the plurality of memory blocks if the next instruction is a first instruction of a program.

In still other embodiments, the next instruction includes a plurality of fields that are stored in one of the plurality of memory blocks.

In still other embodiments, the next instruction includes a plurality of fields that are stored in ones of the plurality of memory blocks, respectively.

In still other embodiments, the next instruction includes a plurality of fields such that at least two of the plurality of fields of the next instruction are stored in a same one of the plurality of memory blocks and another one of the plurality of fields of the next instruction is stored in another one of the plurality of memory blocks.

In still other embodiments, the instruction is a branch instruction, the next instruction is one of a plurality of possible instructions, and the flag field identifies at least one of the plurality of memory blocks to be activated for fetching one of the plurality of possible instructions that has a greatest number of memory blocks to be activated.

In still other embodiments, the processing unit further includes an instruction decoder that is configured to decode the instruction, an operand fetcher that is configured to fetch an operand from a register file location having an address that is stored in a source address field, an execution unit that executes the instruction, and a write back unit that stores results from execution of the instruction in the register file.

In still other embodiments, the flag field includes a number of the at least one of the plurality of memory blocks to be activated for fetching the next instruction.

In still other embodiments, the flag field comprises a code that identifies the at least one of the plurality of memory blocks to be activated for fetching the next instruction.

In still other embodiments, the processing unit is a graphics-processing unit.

In further embodiments of the present invention, a processing unit includes an instruction fetch unit that is configured to fetch an instruction, to activate all of a plurality memory blocks for fetching a next instruction if the instruction is a first instruction of a program, and to activate at least one of the memory blocks for fetching a next instruction based on a flag field in the instruction if the instruction is not a first instruction of the program.

In still further embodiments, the processing unit further includes an instruction memory including the plurality of memory blocks such that the instruction memory has the instruction stored therein.

In still further embodiments, the next instruction includes a plurality of fields that are stored in one of the plurality of memory blocks.

In still further embodiments, the next instruction includes a plurality of fields that are stored in ones of the plurality of memory blocks, respectively.

In still further embodiments, the next instruction includes a plurality of fields such that at least two of the plurality of fields of the next instruction are stored in a same one of the plurality of memory blocks and another one of the plurality of fields of the next instruction is stored in another one of the plurality of memory blocks.

In still further embodiments, the instruction is a branch instruction, the next instruction is one of a plurality of possible instructions, and the flag field identifies at least one of the plurality of memory blocks to be activated for fetching one of the plurality of possible instructions that has a greatest number of memory blocks to be activated.

In still further embodiments, the processing unit further includes an instruction decoder that is configured to decode the instruction, an operand fetcher that is configured to fetch an operand from a register file location having an address that is stored in a source address field, an execution unit that executes the instruction, and a write back unit that stores results from execution of the instruction in the register file.

In still further embodiments, the flag field comprises a number of the at least one of the plurality of memory blocks to be activated for fetching the next instruction.

In still further embodiments, the flag field comprises a code that identifies the at least one of the plurality of memory blocks to be activated for fetching the next instruction.

In still further embodiments, the processing unit is a graphics-processing unit.

In other embodiments, a computer program is compiled by determining at least one of a plurality of memory blocks to be activated for fetching a next instruction and specifying the at least one of the plurality of memory blocks to be activated for fetching the next instruction in a flag field of an instruction.

In still other embodiments, the instruction is a branch instruction, the next instruction is one of a plurality of possible instructions, and the flag field identifies at least one of the plurality of memory blocks to be activated for one of the plurality of possible instructions that has a greatest number of memory blocks to be activated.

In still other embodiments, the method further includes configuring the program to activate all of the plurality of memory blocks for fetching a first instruction of the program.

In still other embodiments, the flag field includes a number of the at least one of the plurality of memory blocks to be activated for fetching the next instruction.

In still other embodiments, the flag field includes a code that identifies the at least one of the plurality of memory blocks to be activated for fetching the next instruction.

In further embodiments, a processing unit is operated by fetching an instruction, activating all of a plurality memory blocks for fetching a next instruction if the instruction is a first instruction of a program, and activating at least one of the plurality of memory blocks for fetching a next instruction based on a flag field in the instruction if the instruction is not a first instruction of the program.

In still further embodiments, the next instruction includes a plurality of fields that is stored in one of the plurality of memory blocks.

In still further embodiments, the next instruction includes a plurality of fields that are stored in ones of the plurality of memory blocks, respectively.

In still further embodiments, the next instruction includes a plurality of fields such that at least two of the plurality of fields of the next instruction are stored in a same one of the plurality of memory blocks and another one of the plurality of fields of the next instruction is stored in another one of the plurality of memory blocks.

In still further embodiments, the instruction is a branch instruction, the next instruction is one of a plurality of possible instructions, and the flag field identifies at least one of the plurality of memory blocks to be activated for fetching one of the plurality of possible instructions that has a greatest number of memory blocks to be activated.

In still further embodiments, the method further includes decoding the instruction, fetching an operand from a register file location having an address that is stored in a source address field, executing the instruction, and storing results from execution of the instruction in the register file.

In still further embodiments, the flag field identifies a number of the at least one of the plurality of memory blocks to be activated for fetching the next instruction.

In still further embodiments, the flag field comprises a code that identifies the at least one of the plurality of memory blocks to be activated for fetching the next instruction.

In still further embodiments, the processing unit is a graphics-processing unit.

In other embodiments, a graphics data processing system includes a host that is configured to generate a request, a graphics processing unit that is configured to process an instruction responsive to the request, the instruction including a plurality of fields, the plurality of fields comprising a flag field that identifies at least one of a plurality of memory blocks to be activated for fetching a next instruction, a frame buffer that is configured to store data processed by the graphics processing unit, and a display system that is configured to display the data stored in the frame buffer.

In still other embodiments, the display system comprises a display control unit that is coupled to a display device.

In further embodiments, a graphics data processing system is operated by generating a request at a host, processing an instruction responsive to the request, the instruction including a plurality of fields, the plurality of fields including a flag field that identifies at least one of a plurality of memory blocks to be activated for fetching a next instruction, storing data processed by the graphics processing unit in a frame buffer, and displaying data stored in the frame buffer on a display system.

Although described above primarily with respect to processing unit, system, and/or method embodiments of the present invention, it will be understood that the present invention can be embodied as a processing unit, system, method, and/or computer program product.

BRIEF DESCRIPTION OF THE DRAWINGS

Other features of the present invention will be more readily understood from the following detailed description of specific embodiments thereof when read in conjunction with the accompanying drawings, in which.

DETAILED DESCRIPTION OF EMBODIMENTS

Figure 1:
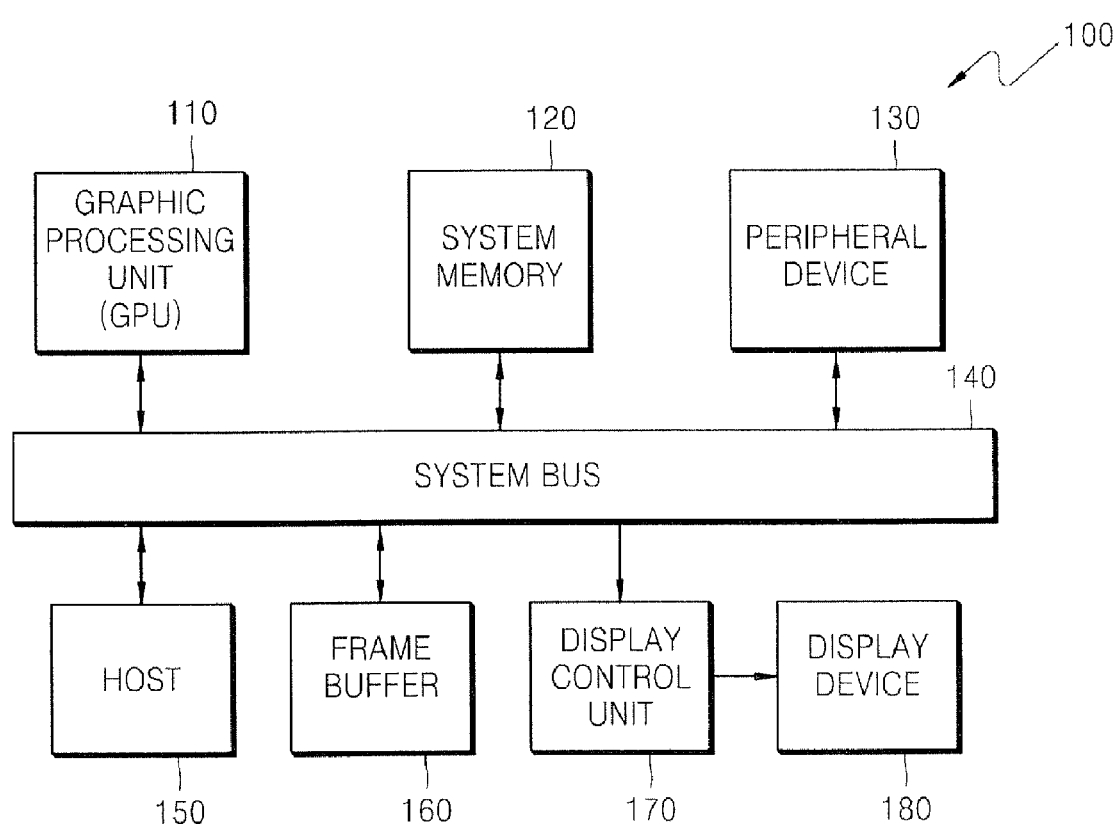
FIG. 1 is a block diagram that illustrates a conventional graphics system.
Figure 2:
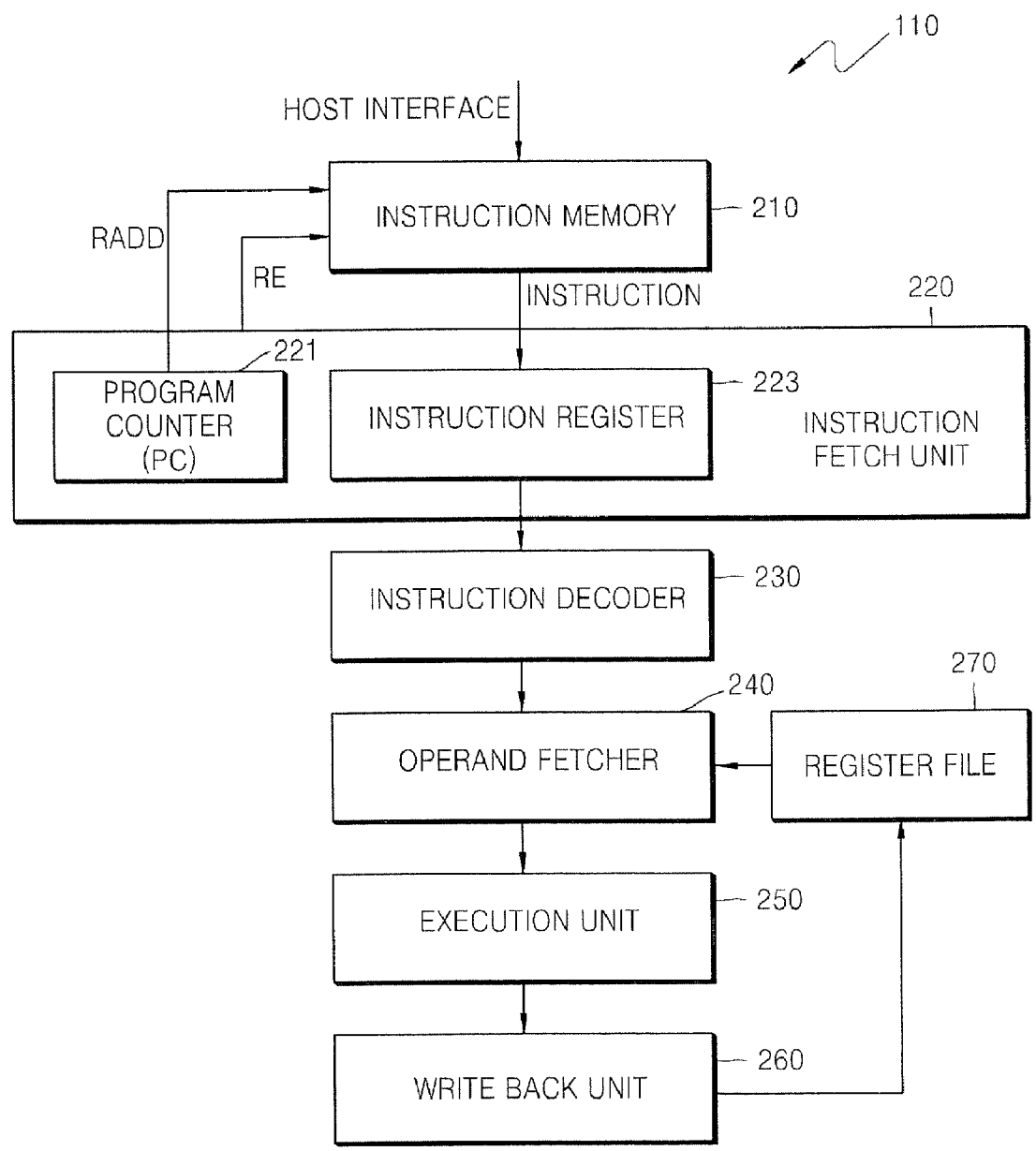
FIG. 2 is a block diagram that illustrates the graphics processing unit of the system of FIG. 1.

While the present invention is susceptible to various modifications and alternative forms, specific embodiments thereof are shown by way of example in the drawings and will herein be described in detail. It should be understood, however, that there is no intent to limit the invention to the particular forms disclosed, but on the contrary, the invention is to cover all modifications, equivalents, and alternatives falling within the spirit and scope of the invention as defined by the claims.

It will be understood that when an element is referred to as being "connected to" or "coupled to" another element, it can be directly connected or coupled to the other element or intervening elements may be present. In contrast, when an element is referred to as being "directly connected to" or "directly coupled to" another element, there are no intervening elements. As used herein, the term "and/or" and "/" includes any and all combinations of one or more of the associated listed items. Like numbers refer to like elements throughout the description.

The terminology used herein is for the purpose of describing particular embodiments only and is not intended to be limiting of the invention. As used herein, the singular forms "a," "an," and "the" are intended to include the plural forms as well, unless the context clearly indicates otherwise. It will be further understood that the teens "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

It will be understood that although the terms first and second are used herein to describe various components, circuits, regions, layers and/or sections, these components, circuits, regions, layers and/or sections should not be limited by these terms. These terms are only used to distinguish one component, circuit, region, layer or section from another component, circuit, region, layer or section. Thus, a first component, circuit, region, layer or section discussed below could be termed a second component, circuit, region, layer or section, and similarly, a second component, circuit, region, layer or section may be termed a first component, circuit, region, layer or section without departing from the teachings of the present invention.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

The present invention may be embodied as systems, methods, and/or computer program products. Accordingly, the present invention may be embodied in hardware and/or in software (including firmware, resident software, micro-code, etc.). Furthermore, the present invention may take the form of a computer program product on a computer-usable or computer-readable storage medium having computer-usable or computer-readable program code embodied in the medium for use by or in connection with an instruction execution system. In the context of this document, a computer-usable or computer-readable medium may be any medium that can contain, store, communicate, propagate, or transport the program for use by or in connection with the instruction execution system, apparatus, or device.

The computer-usable or computer-readable medium may be, for example but not limited to, an electronic, magnetic, optical, electromagnetic, infrared, or semiconductor system, apparatus, device, or propagation medium. More specific examples (a non-exhaustive list) of the computer-readable medium would include the following: an electrical connection having one or more wires, a portable computer diskette, a random access memory (RAM), a read-only memory (ROM), an erasable programmable read-only memory (EPROM or Flash memory), an optical fiber, and a portable compact disc read-only memory (CD-ROM). Note that the computer-usable or computer-readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory.

The present invention is described herein with reference to flowchart and/or block diagram illustrations of methods, systems, and computer program products in accordance with exemplary embodiments of the invention. These flowchart and/or block diagrams further illustrate exemplary operations in accordance with some embodiments of the present invention. It will be understood that each block of the flowchart and/or block diagram illustrations, and combinations of blocks in the flowchart and/or block diagram illustrations, may be implemented by computer program instructions and/or hardware operations. These computer program instructions may be provided to a processor of a general purpose computer, a special purpose computer, or other programmable data processing apparatus to produce a machine, such that the instructions, which execute via the processor of the computer or other programmable data processing apparatus, create means and/or circuits for implementing the functions specified in the flowchart and/or block diagram block or blocks.

These computer program instructions may also be stored in a computer usable or computer-readable memory that may direct a computer or other programmable data processing apparatus to function/operate in a particular manner, such that the instructions stored in the computer usable or computer-readable memory produce an article of manufacture including instructions that implement the function/operation specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions that execute on the computer or other programmable apparatus provide steps for implementing the functions/operations specified in the flowchart and/or block diagram block or blocks.

For purposes of illustration, some embodiments of the present invention are described herein in the context of a graphics processing unit. It will be understood, however, that the present invention is not limited to such embodiments, but can be embodied in other types of processing units. Some embodiments of the present invention stem from a realization that it can be more efficient to only activate memory blocks that contain fields that are used to execute an instruction. By avoiding activating memory blocks to retrieve unused fields, power consumption may be reduced.

Figure 3:
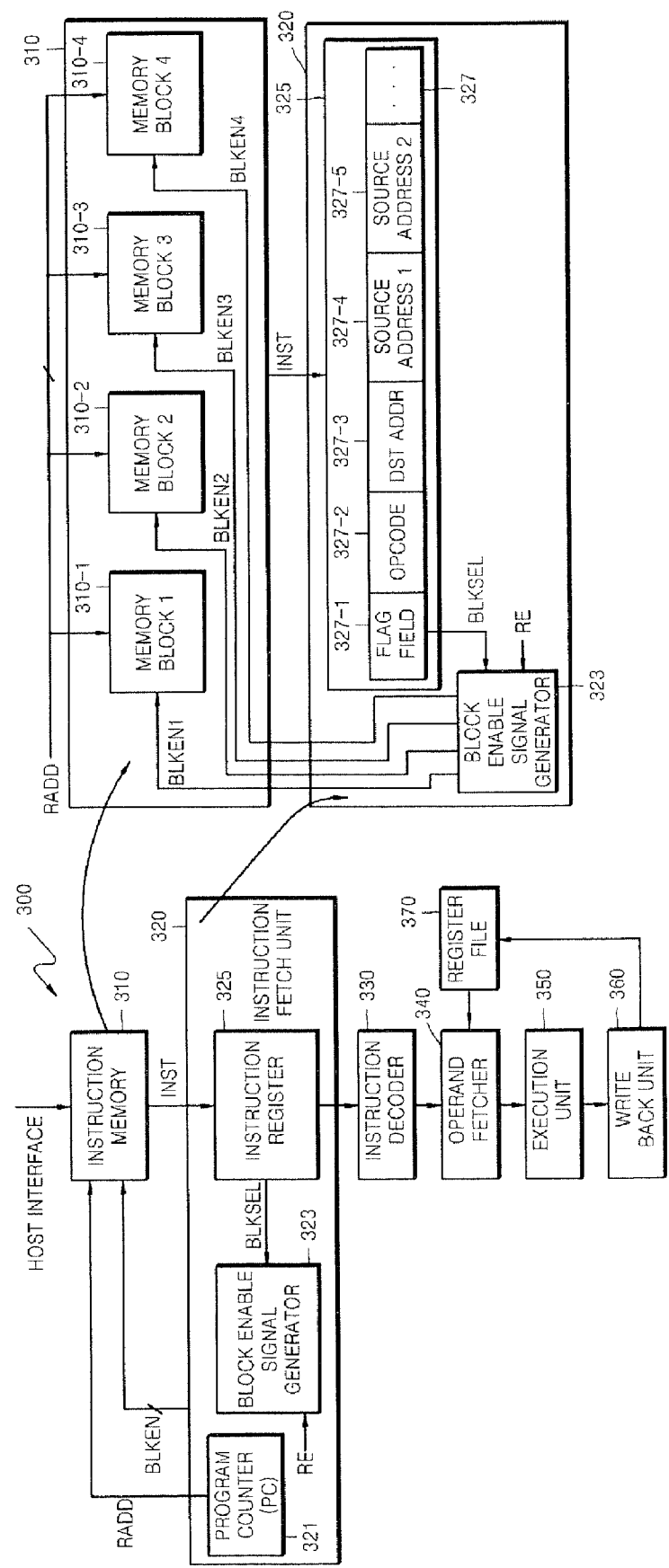
FIG. 3 is a block diagram that a graphics processing unit according to some embodiments of the present invention.
Figure 4A:
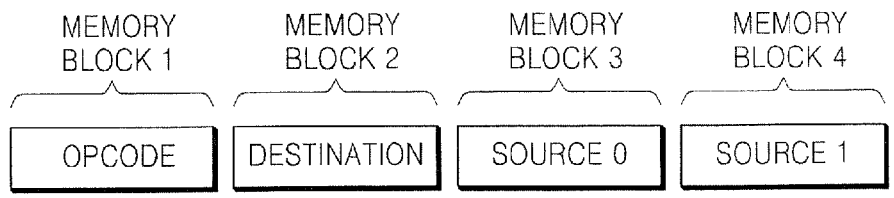
FIGS. 4A-4D are block diagrams that illustrate exemplary storage of instructions fields in memory blocks that comprise an instruction memory according to some embodiments of the present invention.
Figure 4B:
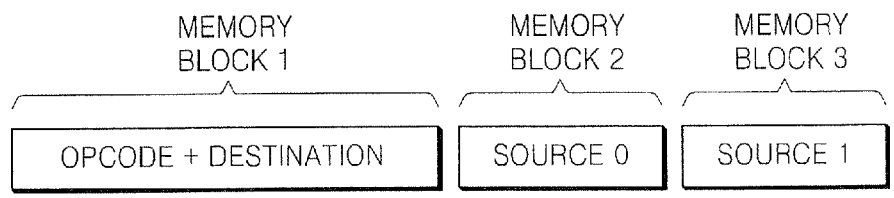
Figure 4C:
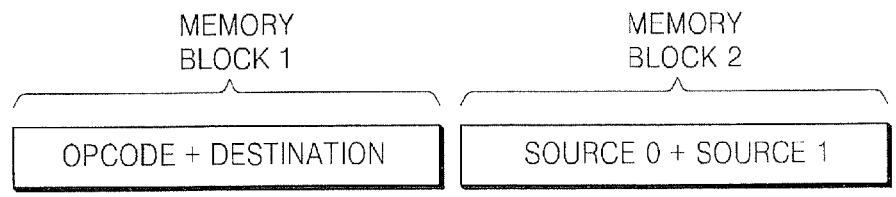
Figure 4D:
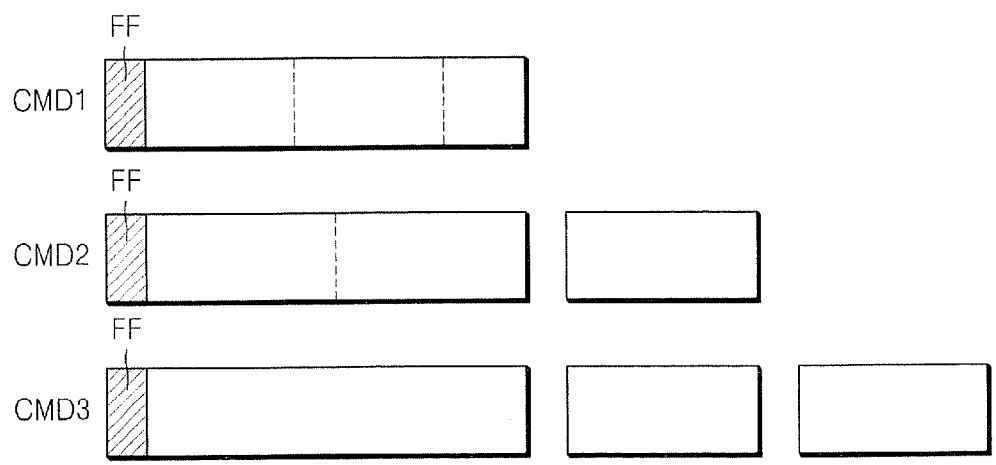

Referring to FIG. 3, a graphics processing unit 300, according to some embodiments of the present invention, includes an instruction memory 310, an instruction fetch unit 320, an instruction decoder 330, an operand fetcher 340, an execution unit 350, a write back unit 360, and a register file 370 that are configured as shown. The instruction fetch unit 320 includes a program counter 321, a block signal enable generator 323, and an instruction register 325. Instructions are stored in the instruction memory 310 based on host requests. As discussed above, an instruction may consist of a plurality of fields, such as an OPCODE, which specifies the type of instruction and the structure of the data on which the instruction operates, and parameters for instruction operation, such as a source address of an operand and/or a destination address of an operation result.

The instruction fetch unit 320 includes a program counter 321 that outputs a row address RADD that is used to access an address of an instruction in the instruction memory 310. The instruction memory 310 outputs an instruction responsive to the row address RADD and a block enable (BLKEN) signal generated by the block enable signal generator 323.

As shown in FIG. 3, the instruction memory 310 includes four memory blocks 310-1-4. The memory blocks may be physically and/or logically separated in the instruction memory. It will be understood that four memory blocks are shown merely for purposes of illustration. The number of memory blocks in the instruction memory 310 may vary in accordance with various embodiments of the present invention. An instruction is constructed by assembling various fields from one or more of the memory blocks 310-1-4. In accordance with some embodiments of the present invention, the instructions are used at RISC (Reduced Instruction Set Computer) system. That is, each of the instructions of the present invention may have a respective length. Each of the instructions has length corresponding to the number of the operands for execution. More detail explanation is offered later. FIG. 3 shows an instruction 327 loaded into the instruction register 325 that includes a flag field 327-1, OPCODE 327-2, destination address 327-3, source address 1 327-4, source address 2 327-5 and possible other fields. The instruction fields 327-* are created during the compile process and stored in memory blocks. The number of fields may vary depending on the number of operands used by a particular instruction. These instruction fields are loaded into the instruction register 325 responsive to the block enable signals BLKEN1-BLKEN4 generated by the block enable signal generator 323 and the read address RADD. The block enable signal generator generates the block enable signals BLKEN* responsive to a block select signal BLKSEL and a read enable signal RE.

In accordance with some embodiments of the present invention, the block select signal BLKSEL may comprise one or more bits in the flag field 327-1 that identify the memory blocks 310-* to be activated for retrieving the next instruction. That is, the flag field 327-1 contains an information about the memory blocks 310-* to be activated for fetching the next instruction, not a branch information. In the example embodiment shown in FIG. 3 in which four memory blocks 310-1-4 are used, two bits may be used in the flag field 327-1 for the block select signal BLKSEL.

Accordingly, an instruction is loaded into the instruction register by activating one or more of the memory blocks 310-1-4 based on the block enable signals BLKEN1-BLKEN4 generated by the block enable signal generator 323 responsive to the block select signal BLKSEL from the flag field 327-1 of the previous instruction and the read enable signal RE.

The instruction decoder 330 decodes the OPCODE of the instruction stored in the instruction register 325 to determine the instruction type. The operand fetcher 340 fetches any operand associated with the instruction based on an operand address contained in the instruction. The execution unit 350 executes the instruction based on the type determined from the OPCODE and the fetched operand if applicable. The write back unit 360 stores the result of executing the instruction in the register file 370 at a destination address specified in the instruction.

Some instructions may not require that all four of the memory blocks 310-1-4 be activated to obtain all of the associated fields when loading these instructions into the instruction register 325. As a result, some embodiments of the present invention may reduce power consumption by activating only those memory blocks 310-1-4 that are needed to load the fields associated with a particular instruction.

Referring to FIG. 4, the instruction fields 327-* can be stored in the memory blocks 310-* in different ways in accordance with various embodiments of the present invention. For example, the OPCODE, destination address, source address 0, and source address 1 may be split across four different memory blocks as shown in FIG. 4A. As shown in FIG. 4B, however, both the OPCODE and destination address can be stored in a single memory block while the source addresses are split across separate memory blocks. FIG. 4C illustrates another example in which the OPCODE and destination address are stored in one memory block while the source addresses are stored in another memory block. It will be understood that the divisions of fields among memory blocks shown in FIGS. 4A-4C are merely for purposes of illustration. Instruction fields can be assigned to memory blocks in a variety of ways in accordance with different embodiments of the present invention. As shown in FIG. 4A-4C, the instruction fields 327-* of an instruction are stored in the memory blocks 310-* in different ways in accordance with various embodiments of the present invention. There can be the different embodiment. Referring to FIG. 4D, as mentioned above, a plurality of instructions have different length each other. Especially, FIG. 4D shows the three instructions have different length each other. The first instruction CMD1 has the shortest length among the three instructions, and the third instruction CMD3 has the longest length among the three instructions. Each of the three instructions can include a plurality of instruction fields. In an embodiment of the present invention, the number of the memory blocks required to store instructions varies or may be adjusted based on the shortest instruction. For example, if the shortest instruction CMD1 among the three instructions of FIG. 4 is stored in one memory block, the second instruction CMD2 may be stored in two memory blocks and the third instruction CMD3 may be stored in three memory blocks among the memory blocks 310-*. In this case the flag field FF is included in a memory block storing the shortest instruction CMD1. That is, each of the flag fields FF of the second instruction CMD2 and the third instruction CMD3, both of which are splited across the different memory blocks, may be stored in the memory block storing the shortest instruction CMD1. Because the memory block storing the shortest instruction will be always activated, it can reduce the power consumption to storing the flag fields there.

Figure 5:
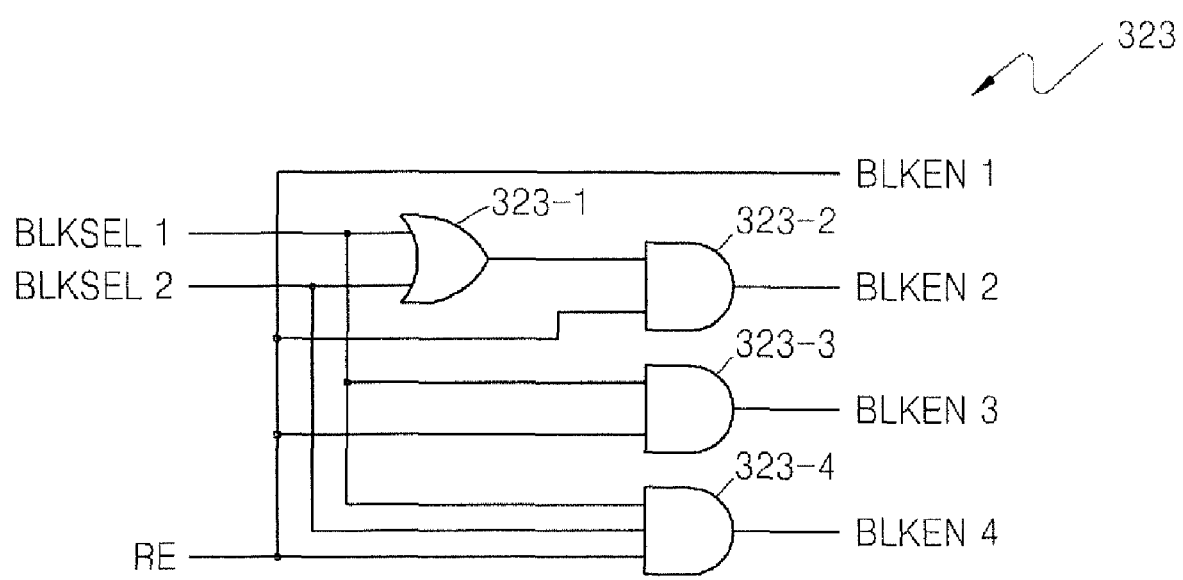
FIG. 5 is a logic diagram of a memory block enable signal generator in accordance with some embodiments of the present invention.

Memory blocks can be activated successively or cumulatively in accordance with some embodiments of the present invention. In other embodiments, the memory blocks can be activated selectively or in random combinations. FIG. 5 is circuit schematic of the block enable signal generator 323 of FIG. 3, according to some embodiments of the present invention, in which the memory blocks can be activated successively or cumulatively. As discussed above, the block enable signals BLKEN* can be used to activate the memory blocks 310-8, respectively, responsive to the block select signals BLKSEL* and the read enable signal RE. In the example shown in FIGS. 3 and 5, two bits are used for the block select signals BLKSEL1 and BLKSEL2 because instruction memory 310 includes four memory blocks 310-1-4. Based on the logic gates 323-1-4 comprising the block enable signal generator 323, memory block 310-1 is activated via block enable signal BLKEN1 responsive to activation of the read enable signal RE; memory blocks 310-1 and 310-2 are activated via block enable signals BLKEN1 and BLKEN2 responsive to activation of the read enable signal RE and block select signal BLKSEL2; memory blocks 310-1-3 are activated via block enable signals BLKEN1-3 responsive to activation of the read enable signal RE and block select signal BLKSEL1; and memory blocks 310-1-4 are activated via block enable signals BLKEN1-4 responsive to activation of the read enable signal RE and block select signals BLKSEL1 and BLKSEL2.

In other embodiments, the flag field may contain a code that identifies one or more specific memory blocks to be activated via the block enable signal generator 323.

Figure 6:
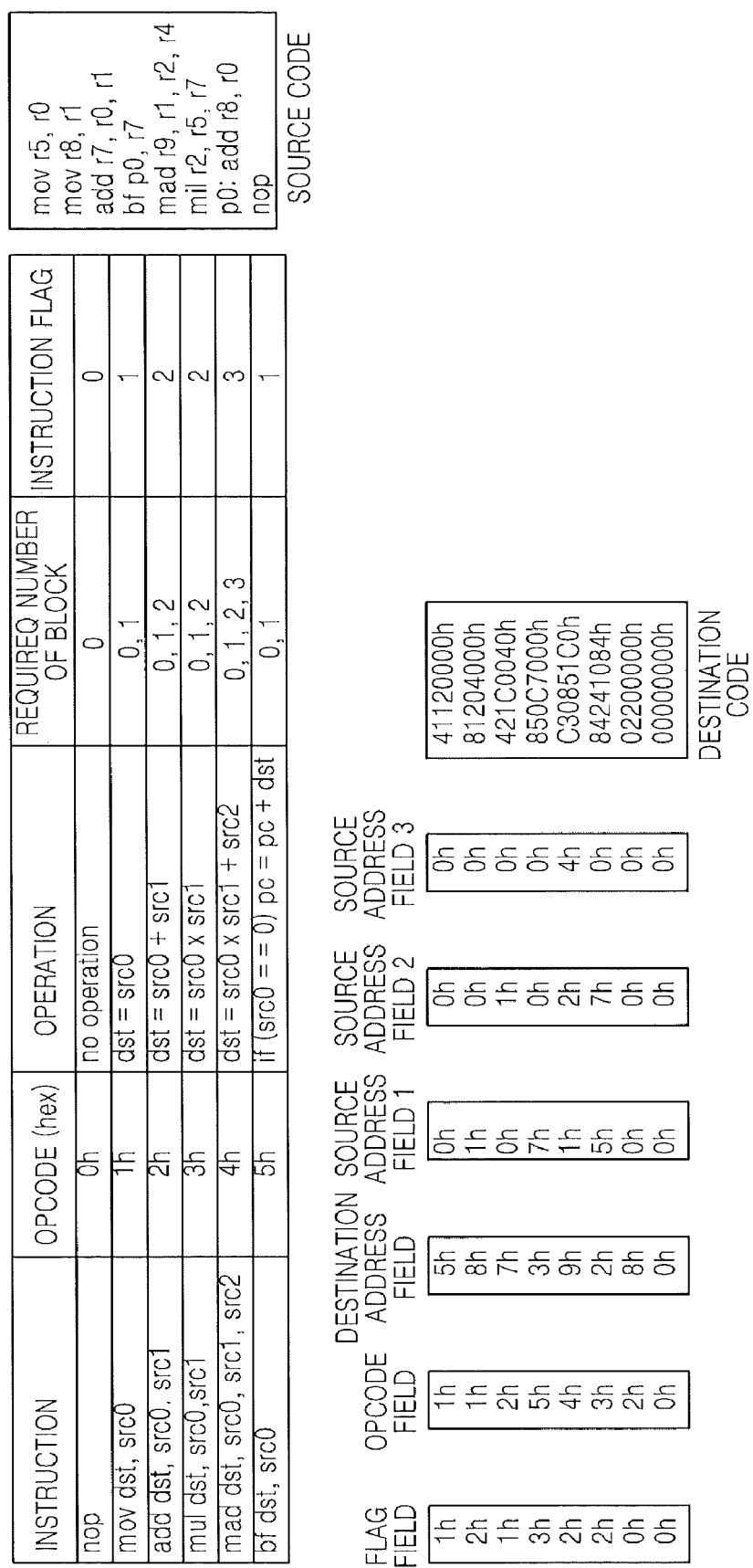
FIG. 6 is a table that illustrates exemplary assembly code instructions and the number of memory blocks that may be activated when retrieving the instructions from an instruction memory in accordance with some embodiments of the present invention.

As discussed above, the block select signal BLKSEL may comprise one or more bits in the flag field 327-1 that identify the memory blocks 310-* to be activated for retrieving the next instruction. For the first instruction of a program, the block enable signal generator 323 may be configured to activate all of the memory blocks in the instruction memory 310. The first instruction of a program may be stored in address "0" of a memory storing the program. Also, the first instruction of a program may be stored in a predetermined address which is a state address of executing of the program. In this case, the predetermined address is related to information of the program by a complier. For a branch instruction, however, there are multiple possibilities for the next instruction. In accordance with some embodiments of the present invention, the flag field of a branch instruction may identify memory blocks to be activated for the instruction that requires the greatest number of memory blocks to be activated among the possible instructions that could follow the branch instruction. This illustrated, for example, in FIG. 6 where several types of assembly instructions are listed along with the required number of memory blocks to be activated and the appropriate value for the instruction flag. Note that the flag field value corresponds to the number of required blocks minus one for all operations except for a no-operation (nop). This is because in the example shown in FIG. 5, one memory block is activated responsive to the read enable signal RE. In the example program, a branch instruction (bf) is included in which one possible branch location is to the label p0 and the other branch location is the following instruction. The label p0 is assigned to an add (add) instruction while the instruction following the branch instruction is a multiply and add (mad) instruction. The add instruction requires three memory blocks to be activated while the mad instruction requires four memory blocks to be activated. Thus, the flag field for the branch instruction is set to 3, as the multiply and add instruction requires the most memory blocks to be activated (four) of the two possible instructions that may follow the branch instruction.

Exemplary operations for activating only memory blocks that contain fields that are used to execute a program instruction, in accordance with some embodiments of the present invention, will now be described with reference to FIG. 7. Operations begin at block 810 where a graphics processing program, which includes source code instructions, is compiled to generate object code instructions. At block 820, the fields comprising each object code instruction are stored in one or more of a plurality of memory blocks comprising an instruction memory. An object code instruction is then reassembled for execution by activating only those memory block(s) that contain field(s) comprising the instruction at block 830.

Figure 8:
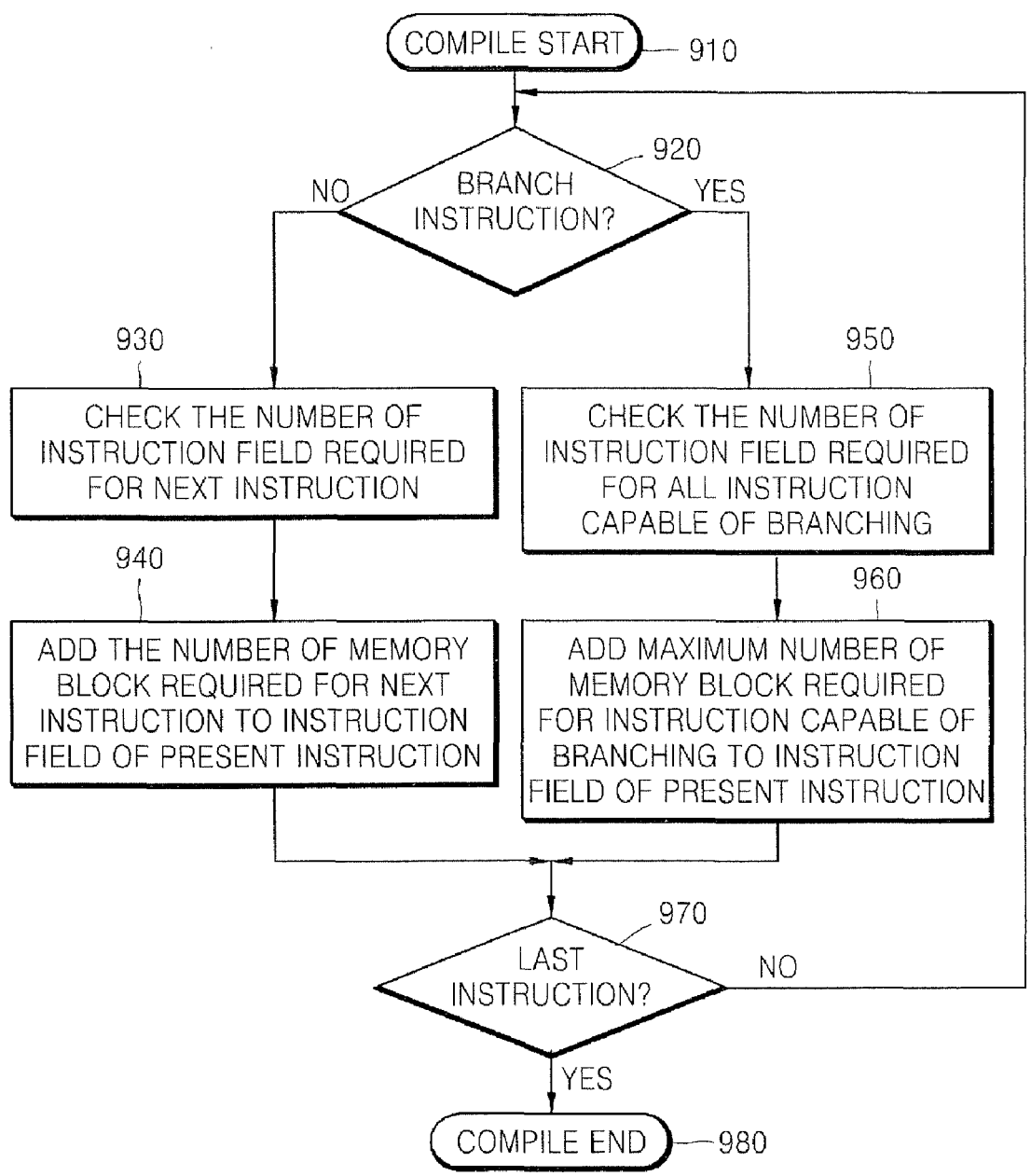

FIG. 8 illustrates operations for compiling a program in accordance with some embodiments of the present invention. Operations begin at block 910 where the compile is initiated. At block 920, a determination is made whether the source code instruction is a branch instruction. If the instruction is determined not to be a branch instruction, then operations continue at block 930 where a determination is made of what fields are needed to compose the next instruction. At block 940, the flag field is set for the compiled object code instruction so that the block enable signal generator activates the required memory blocks for composing the next instruction when retrieving the next instruction for execution.

If, however, it is determined that the source code instruction is a branch instruction at block 920, then operations continue at block 950 where a determination is made what fields are needed to compose each of the possible instructions that may follow the branch instruction. At block 960, the flag field is set for the compiled object code instruction so that the block enable signal generator activates the number of memory blocks corresponding to the possible instruction that follows the branch instruction that requires the maximum number of memory blocks to be activated when retrieving the next instruction for execution.

Following block 940 or 960, a determination is made at block 970 whether this is the last source code instruction to be compiled. If it is the last instruction, then compilation operations end at block 980. Otherwise, operations continue at block 920.

Figure 9:
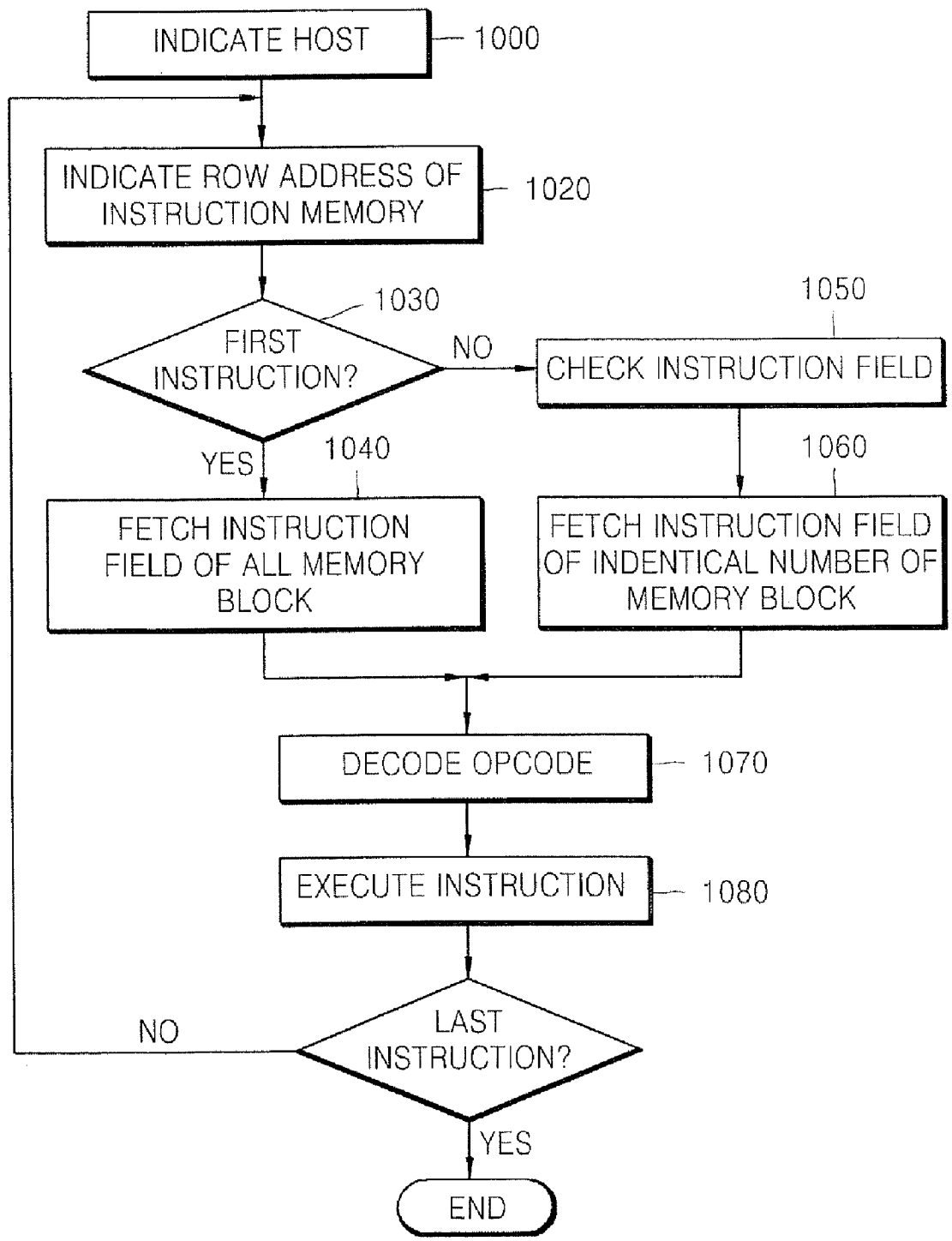

Referring now to FIG. 9, operations for executing a graphics program using a graphics processing unit, in accordance with some embodiments of the present invention, begin at block 1000 where a host submits a request to the graphics processing unit. Processing of the graphics program begins at block 1020 where a row address for an instruction in the instruction memory is identified. A determination is made at block 1030 whether the instruction is the first instruction of the program. If the instruction is the first instruction of the program, then all memory blocks are activated for fetching the instruction fields associated with the first instruction at block 1040. If the instruction is not the first instruction of the program, then the flag field of the instruction currently in the instruction register is examined at block 1050. Based on this flag field, only those memory blocks that are required for composing the next instruction are activated when fetching the next instruction at block 1060. Operations continue at block 1070 where the opcode of the instruction is decoded and then the instruction is executed at block 1080. At block 1090 a determination is made whether this is the last instruction to be executed. If so, then operations for executing the graphics program terminate; otherwise, operations continue at block 1020.

Figure 7:
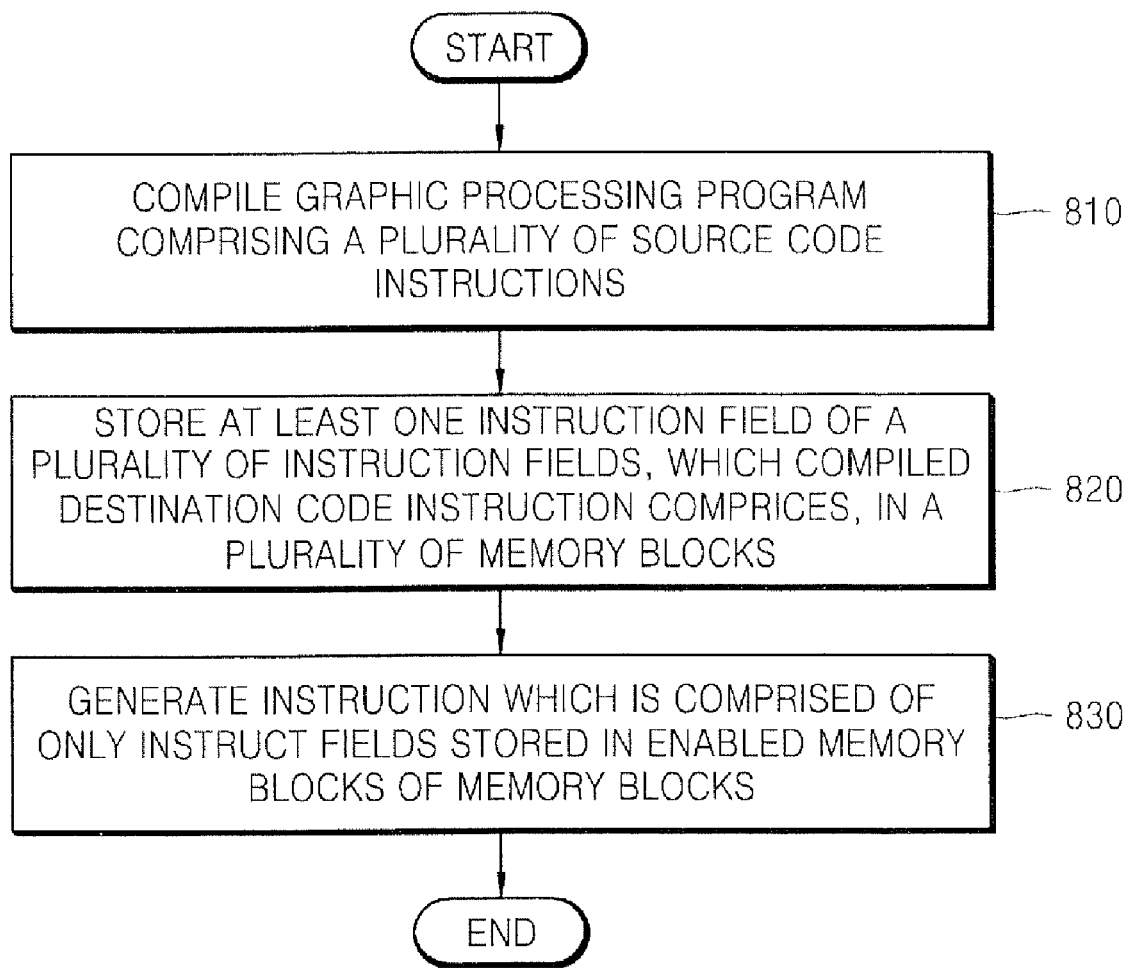
FIGS. 7-9 are flowcharts that illustrate operations for selectively activating memory blocks when fetching program instructions in accordance with some embodiments of the present invention.

The flowcharts of FIGS. 7-9 illustrate the architecture, functionality, and operations of some embodiments of methods, systems, and computer program products for selectively activating memory blocks when fetching program instructions. In this regard, each block represents a module, segment, or portion of code, which comprises one or more executable instructions for implementing the specified logical function (s). It should also be noted that in other implementations, the function(s) noted in the blocks may occur out of the order noted in FIGS. 5-7. For example, two blocks shown in succession may, in fact, be executed substantially concurrently or the blocks may sometimes be executed in the reverse order, depending on the functionality involved.

In concluding the detailed description, it should be noted that many variations and modifications can be made to the preferred embodiments without substantially departing from the principles of the present invention. All such variations and modifications are intended to be included herein within the scope of the present invention, as set forth in the following claims.

The invention claimed is:

1. A processing unit, comprising:
an instruction fetch unit that is configured to process a compiled instruction that comprises a plurality of fields, the plurality of fields comprising a flag field that identifies which of a plurality of memory blocks to be activated for fetching a next instruction, each of the memory blocks having stored therein one or more fields used to form the next instruction and assigned to the memory blocks in a predetermined way; and
a block enable signal generator that is configured to generate at least one block enable signal to selectively activate at least one of the memory blocks in the predetermined way based on a number identified by the flag field, wherein the flag field is included in one of the plurality of memory blocks that is used to store an instruction having the shortest length among instructions of the processing unit.

2. The processing unit of claim 1, wherein the block enable signal generator is configured to generate block enable signals to activate all memory blocks in an instruction memory if the next instruction is a first instruction of a program, the memory blocks in the instruction memory comprising the plurality of memory blocks.

3. The processing unit of claim 1, wherein at least two of the plurality of fields of the next instruction are stored in a same one of the plurality of memory blocks and another one of the plurality of fields of the next instruction is stored in another one of the plurality of memory blocks.

4. The processing unit of claim 1, wherein the instruction is a branch instruction, the next instruction is one of a plurality of possible instructions, and the flag field identifies information of memory blocks to be activated for fetching one of the plurality of possible instructions that has a greatest number of memory blocks to be activated.

5. The processing unit of claim 1, further comprising:
an instruction decoder that is configured to decode the instruction;
an operand fetcher that is configured to fetch an operand from a register file location having an address that is stored in a source address field;
an execution unit that executes the instruction; and
a write back unit that stores results from execution of the instruction in the register file.

6. The processing unit of claim 1, wherein the processing unit is a graphics-processing unit.

7. The processing unit of claim 1, wherein the processing unit adopts RISC(Reduced Instruction Set Computer) system.

8. A method of compiling a computer program, comprising:
determining information of memory blocks to be activated for fetching a compiled next instruction, each of the plurality of memory blocks having stored therein one or more fields used to form the next instruction and assigned to the memory blocks in a predetermined way; and
specifying information of which of the memory blocks to be activated for fetching the next instruction in the predetermined way in a flag field of an instruction,
wherein the flag field is included in one of the memory blocks that is used to store an instruction having the shortest length among instructions of the processing unit.

9. The method of claim 8, wherein the instruction is a branch instruction, the next instruction is one of a plurality of possible instructions, and the flag field identifies information of memory blocks to be activated for one of the plurality of possible instructions that has a greatest number of memory blocks to be activated.

10. The method of claim 8, further comprising:
configuring the program to activate all memory blocks in an instruction memory for fetching a first instruction of the program, the memory blocks in the instruction memory comprising the plurality of memory blocks.

11. A graphics data processing system, comprising:
a host that is configured to generate a request;
a graphics processing unit that is configured to process an compiled instruction responsive to the request, the instruction comprising a plurality of fields, the plurality of fields comprising a flag field that identifies which of a plurality of memory blocks to be activated for fetching a next instruction, each of the memory blocks having stored therein one or more fields used to form the next instruction and assigned to the memory blocks in a predetermined way, and comprising a block enable signal generator that is configured to generate at least one block enable signal to selectively activate at least one of the memory blocks in the predetermined way based on a number indentified by the flag field;

a frame buffer that is configured to store data processed by the graphics processing unit; and a display system that is configured to display the data stored in the frame buffer, wherein the flag field is included in one of the plurality of memory blocks that is used to store an instruction having the shortest length among instructions of the graphic data processing unit.

12. The graphics data processing system of claim 11, wherein the display system comprises a display control unit that is coupled to a display device.

13. The graphics data processing system of claim 11, wherein the block enable signal generator is configured to generate block enable signals to activate all memory blocks in an instruction memory if the next instruction is a first instruction of a program, the memory blocks in the instruction memory comprising the plurality of memory blocks.

14. The graphics data processing system of claim 11, wherein at least two of the plurality of fields of the next instruction are stored in a same one of the plurality of memory blocks and another one of the plurality of fields of the next instruction is stored in another one of the plurality of memory blocks.

15. The graphics data processing system of claim 11, wherein the instruction is a branch instruction, the next instruction is one of a plurality of possible instructions, and the flag field identifies information of memory blocks to be activated for fetching one of the plurality of possible instructions that has a greatest number of memory blocks to be activated.

16. The graphics data processing system of claim 11, wherein the graphics-processing unit further comprises:
an instruction decoder that is configured to decode the instruction;
an operand fetcher that is configured to fetch an operand from a register file location having an address that is stored in a source address field;
an execution unit that executes the instruction; and
a write back unit that stores results from execution of the instruction in the register file.

* * * * *